US008622834B2

(12) United States Patent
Yamaguchi et al.

(10) Patent No.: US 8,622,834 B2
(45) Date of Patent: Jan. 7, 2014

(54) GAME CONTROL SYSTEM RECORDING MEDIUM AND GAME SYSTEM CONTROL METHOD

(75) Inventors: Tsuyoshi Yamaguchi, Sakai (JP); Daisuke Sogabe, Toyonaka (JP); Junichi Fujita, Sakai (JP); Jun Hayashi, Suita (JP); Kazuya Takahashi, Sakai (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 67 days.

(21) Appl. No.: 13/136,818

(22) Filed: Aug. 11, 2011

(65) Prior Publication Data

US 2012/0046105 A1    Feb. 23, 2012

(30) Foreign Application Priority Data

Aug. 19, 2010   (JP) .................................. 2010-184098

(51) Int. Cl.
*A63F 13/00*    (2006.01)

(52) U.S. Cl.
USPC ................................................ 463/37; 463/4

(58) Field of Classification Search
USPC .................... 463/4, 9, 23, 37, 40, 42
See application file for complete search history.

(56) References Cited

U.S. PATENT DOCUMENTS

| 6,530,834 | B2* | 3/2003 | Kondo .............................. 463/4 |
| 2001/0031655 | A1* | 10/2001 | Tanibuchi et al. ................ 463/3 |
| 2002/0010024 | A1* | 1/2002 | Kusuda ........................... 463/42 |
| 2004/0242294 | A1* | 12/2004 | Shiozawa ......................... 463/9 |
| 2006/0246973 | A1* | 11/2006 | Thomas et al. ................... 463/4 |

FOREIGN PATENT DOCUMENTS

JP    2001-137555    5/2001

OTHER PUBLICATIONS

"NFL Head Coach 09 Review" by Nate Ahearn. Published on Sep. 8, 2008.*

* cited by examiner

*Primary Examiner* — Arthur O. Hall
*Assistant Examiner* — Allen Chan
(74) *Attorney, Agent, or Firm* — Jordan and Hamburg LLP

(57) ABSTRACT

A manager evaluation value setting unit sets a manager evaluation value indicating a management ability of a manager character to manage player characters. A player evaluation value setting unit sets a player evaluation value used to evaluate the player character according to an ability value indicating an ability of the player character. An evaluation difference value calculating unit calculates an evaluation difference value indicating a difference between the manager evaluation value and the player evaluation value when the manager evaluation value is lower than the player evaluation value. A management ability setting unit changes the manager evaluation value to reduce the management ability of the manager character as the evaluation difference value increases.

9 Claims, 11 Drawing Sheets

| EVALUATION DIFFERENCE VALUE | INSTRUCTION ACCOMPLISHMENT RATE |
|---:|---:|
| 1 | 90 |
| 2 | 80 |
| 3 | 70 |
| 4 | 60 |
| 5 | 50 |
| 6 | 40 |
| 7 | 30 |
| 8 | 20 |
| 9 | 10 |
| 10 | 0 |

| EVALUATION DIFFERENCE VALUE | USE LIMITED COMMAND DECREASE VALUE |
|---:|---:|
| 1 | 1 |
| 2 | 1 |
| 3 | 2 |
| 4 | 2 |
| 5 | 3 |
| 6 | 3 |
| 7 | 4 |
| 8 | 5 |
| 9 | 6 |
| 10 | 7 |

| EVALUATION DIFFERENCE VALUE | CONDITION DECREASE PROBABILITY |
|---:|---:|
| 1 | 10 |
| 2 | 20 |
| 3 | 30 |
| 4 | 40 |
| 5 | 50 |
| 6 | 60 |
| 7 | 70 |
| 8 | 80 |
| 9 | 90 |
| 10 | 100 |

| SELECTION NUMBER VALUE | RELAXING VALUE |
|---|---|
| 10~15 | 1 |
| 15~20 | 2 |
| 20~25 | 3 |
| 25~30 | 4 |
| 30~35 | 5 |
| 35~40 | 6 |
| 40~45 | 7 |
| 45~50 | 8 |
| 50~55 | 9 |
| 55 OR ABOVE | 10 |

| MANAGER EVALUATION VALUE | RELAXING VALUE |
|---|---|
| 100~110 | 1 |
| 110~120 | 2 |
| 120~130 | 3 |
| 130~140 | 4 |
| 150~160 | 5 |
| 160~170 | 6 |
| 170~180 | 7 |
| 190~200 | 8 |
| 210~220 | 9 |
| 220 OR ABOVE | 10 |

GAME CONTROL SYSTEM RECORDING MEDIUM AND GAME SYSTEM CONTROL METHOD

BACKGROUND OF THE INVENTION AND RELATED ART STATEMENT

1. Field of the Invention

The present invention relates to a technology for controlling the progress of a match game in which a group composed of a head character and a follower character which acts in accordance with action instructions of the head character competes with another team.

2. Description of the Related Art

In actual baseball games, if a manager is not skillful or not experienced, famous players with high ability, veteran players and the like often seem to act on their own judgment without following instructions of the manager. On the other hand, such as when a manager is skillful or experienced in leading a team to win the title, even famous players and veteran players have a respect for the manager and have a higher tendency to act in accordance with the manager's instructions. In actual baseball, such a subtle power relationship between players and a manager is one important element which influences the atmosphere of a team and the players' play and livens up a game. Accordingly, if such an element that players act or do not act as instructed by a manager in view of a power relationship between the players and the manager is incorporated into a baseball game, it is thought that reality of the baseball game is increased and the baseball game can be made more interesting and enjoyable.

On the other hand, although a game player plays a game as a manager in some of conventional baseball games, it is limited to merely give certain instructions to players as the manager and a relationship between the manager and the players is not particularly considered. For example, JP2001-137555 discloses a match game using a communication line. In paragraphs [0023] to [0026] of this publication, it is disclosed that a command can be selected as a manager and a game player can enjoy a game as if he were a manager or the like and also that the command can be selected at least at one of the following timings; every game, for each opponent, every inning, every pitch, for each pitcher, every at-bat, for each batter and for each runner. Note that patent literature 1 further discloses that a game property is improved by incorporating real-world information.

However, in patent literature 1, after a game player as a manager selects a command, a game progresses merely in accordance with the command and a subtle power relationship between the players and the manager as described above and the like are not considered there.

SUMMARY OF THE INVENTION

An object of the present invention is to provide a game control system, a recording medium, a game control method and the like for realizing a nonconventional game into which such an element that another character acts or does not act as instructed by one character in accordance with a power relationship of the one character and the other character is incorporated.

One aspect of the present invention is directed to a game control device for controlling the progress of a match game in which a group composed of a head character and a follower character which acts in accordance with action instructions of the head character competes with another group in a game space, comprising a follower character controlling unit for determining an action instruction to be given to the follower character by the head character in accordance with an operation command entered by a game player using an operation unit and causing the follower character to act in accordance with the determined action instruction; a first evaluation value setting unit for setting a first evaluation value used to evaluate a management ability of the head character to manage the follower character; a second evaluation value setting unit for setting a second evaluation value used to evaluate the follower character based on an ability value indicating an ability of the follower character; an evaluation difference value calculating unit for calculating an evaluation difference value indicating a difference between the first and second evaluation values when the first evaluation value is lower than the second evaluation value; and a head character management ability setting unit for setting a management ability value used to reflect the management ability on the match game based on the evaluation difference value, the head character management ability setting unit changing the management ability value to reduce the management ability of the head character as the evaluation difference value increases.

Another aspect of the present invention is directed to a computer-readable recording medium storing a game control program for causing a computer to function as a game control system for controlling the progress of a match game in which a group composed of a head character and a follower character which acts in accordance with action instructions of the head character competes with another group in a game space, wherein the computer is caused to function as a follower character controlling unit for determining an action instruction to be given to the follower character by the head character in accordance with an operation command entered by a game player using an operation unit and causing the follower character to act in accordance with the determined action instruction; a first evaluation value setting unit for setting a first evaluation value used to evaluate a management ability of the head character to manage the follower character; a second evaluation value setting unit for setting a second evaluation value used to evaluate the follower character based on an ability value indicating an ability of the follower character; an evaluation difference value calculating unit for calculating an evaluation difference value indicating a difference between the first and second evaluation values when the first evaluation value is lower than the second evaluation value; and a head character management ability setting unit for setting a management ability value used to reflect the management ability on the match game based on the evaluation difference value, the head character management ability setting unit changing the management ability value to reduce the management ability of the head character as the evaluation difference value increases.

Still another aspect of the present invention is directed to a game control method by which a computer controls the progress of a match game in which a group composed of a head character and a follower character which acts in accordance with action instructions of the head character competes with another group in a game space, the method comprising a follower character controlling step in which the computer determines an action instruction to be given to the follower character by the head character in accordance with an operation command entered by a game player using an operation unit and causes the follower character to act in accordance with the determined action instruction; a first evaluation value setting step in which the computer sets a first evaluation value used to evaluate a management ability of the head character to manage the follower character; a second evaluation value setting step in which the computer sets a second evaluation value used to evaluate the follower character based on an ability value indicating an ability of the follower character; an evaluation difference value calculating step in which the computer calculates an evaluation difference value indicating a difference between the first and second evaluation values when the first evaluation value is lower than the second evaluation value; and a head character management ability setting step in which the computer sets a management ability value used to reflect the management ability on the match game based on the evaluation difference value, the management ability value being changed to reduce the management ability of the head character as the evaluation difference value increases in the head character management ability setting step.

These and other objects, features and advantages of the present invention will become more apparent from an embodiment described with reference to accompanying drawings.

BRIEF DESCRIPTION OF THE DRAWING

FIG. 3 is a table showing an example of data configuration of an instruction accomplishment rate determination table, FIG. 4 is a table showing an example of data configuration of a decrease value determination table, FIG. 5 is a table showing an example of data configuration of a condition decrease probability determination table, FIG. 12 is a table showing an example of data configuration of a management ability specification table, and FIG. 13 is a table showing another example of data configuration of the management ability specification table.

DETAILED DESCRIPTION OF THE PREFERRED EMBODIMENTS OF THE INVENTION

The invention is now described, by way of example, with reference to the accompanying drawings.

This application is based on Japanese Patent Application Serial No. 2010-184098 filed with the Japan Patent Office on Aug. 19, 2010, the contents of which are hereby incorporated by reference.

Figure 1:
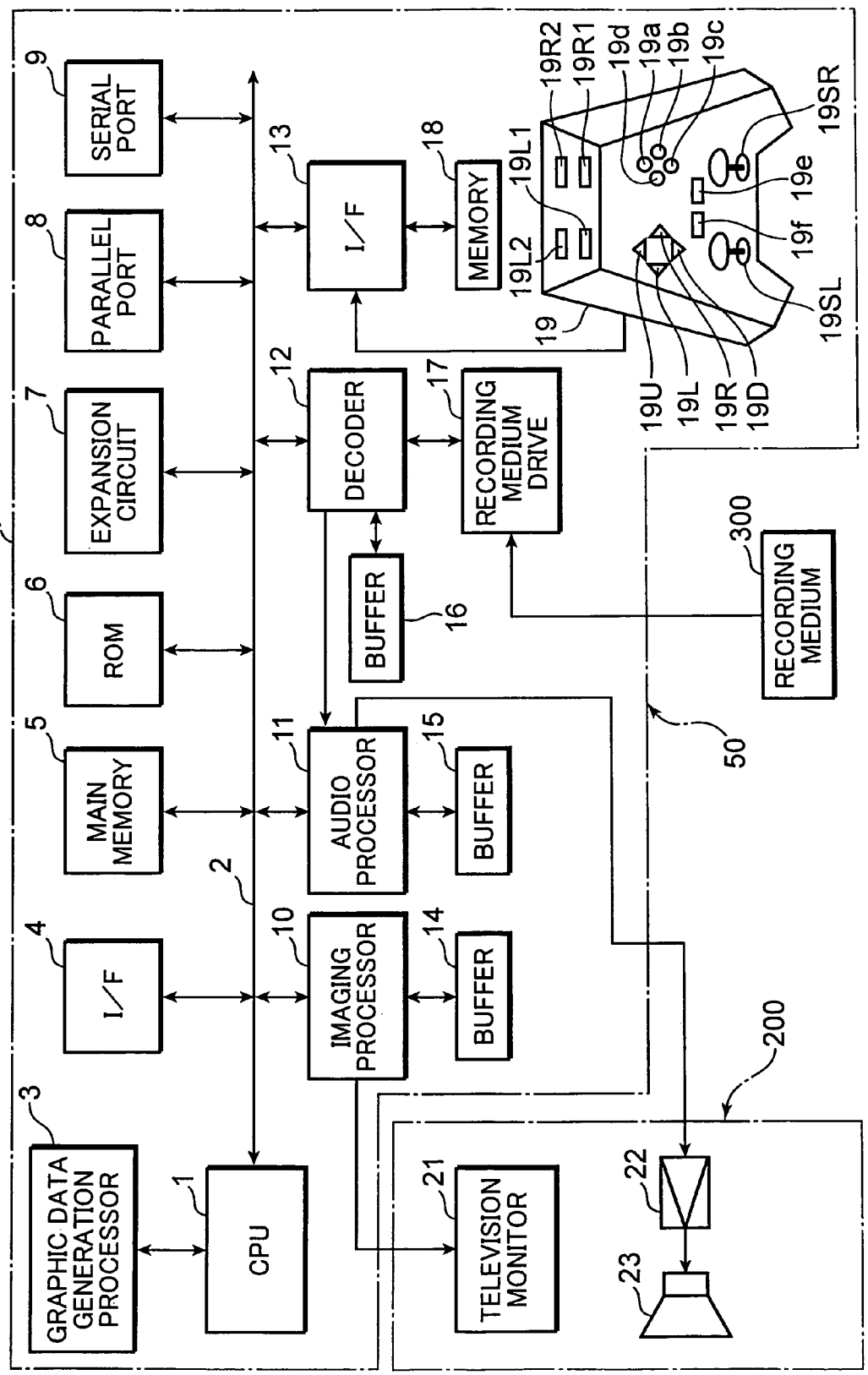
FIG. 1 is a block diagram showing the construction of a game system according to one embodiment of the invention.

Hereinafter, a game system according to one embodiment of the present invention is described with reference to the drawings. FIG. 1 is a block diagram showing the construction of the game system according to the embodiment of the present invention. Although a home video game system constructed by connecting a home video game machine to a home television is described as an example of a game system in the following description, the present invention is not particularly limited to this example and is also similarly applicable to a mobile game system or mobile phone with an integrated monitor, a personal computer which functions as a game system by implementing a game control program according to the present invention, and the like.

The game system shown in FIG. 1 includes a home game machine 100 and a television 200. A computer-readable recording medium 300 storing a game program is loaded into the home game machine 100, and the game program is read as needed to implement a game.

The home game machine 100 includes a CPU (Central Processing Unit) 1, a bus line 2, a graphic data generation processor 3, an interface circuit (I/F) 4, a main memory 5, a ROM (Read Only Memory) 6, an expansion circuit 7, a parallel port 8, a serial port 9, an imaging processor 10, an audio processor 11, a decoder 12, an interface circuit (I/F) 13, buffers 14 to 16, a recording medium drive 17, a memory 18 and a controller 19. The television 200 includes a television monitor 21, an amplification circuit 22 and a speaker 23.

The CPU 1 is connected to the bus line 2 and the graphic data generation processor 3. The bus line 2 includes an address bus, a data bus, a control bus and the like and connects the CPU 1, the interface circuit 4, the main memory 5, the ROM 6, the expansion circuit 7, the parallel port 8, the serial port 9, the imaging processor 10, the audio processor 11, the decoder 12 and the interface circuit 13 to each other.

When the game system is constructed using a personal computer, a work station or the like as a core, the television monitor 21 and the like correspond to a display for computer. Further, the expansion circuit 7, the imaging processor 10, the audio processor 11 and the like respectively correspond to part of data of a game control program stored in the recording medium 300 or hardware on an extension board mounted in an extension slot of the computer. Further, the interface circuit 4, the parallel port 8, the serial port 9 and the interface circuit 13 correspond to hardware on the extension board mounted in the extension slot of the computer. Further, the buffers 14 to 16 respectively correspond to storage areas of the main memory 5 or an extension memory.

Next, the respective constituent elements shown in FIG. 1 are described. The graphic data generation processor 3 functions as a coprocessor, so to speak, of the CPU 1. That is, the graphic data generation processor 3 performs coordinate transformation and light source calculation, e.g. calculation of fixed-point matrices and vectors by a parallel processing.

Main processings performed by the graphic data generation processor 3 include a processing of calculating address data of a processing target image on a specified display area based on coordinate data, movement amount data and rotation amount data of vertices of image data supplied from the CPU 1 in a two-dimensional or three-dimensional space and returning the calculated address data to the CPU 1, a processing of calculating the luminance of an image according to a distance from a virtually set light source, and other processings.

The interface circuit 4 is used for interface with peripheral devices, e.g. pointing devices such as a mouse and a track ball. The main memory 5 is composed of a RAM (Random Access Memory) and the like. Program data which serve as an operating system of the game system are stored in the ROM 6.

The expansion circuit 7 performs an expansion processing on a compressed image compressed by intra coding based on the MPEG (Moving Picture Experts Group) standard for moving images or the JPEG (Joint Photographic Experts Group) standard for still images. The expansion processing includes a decoding processing (decoding of data encoded by a VLC (Variable Length Code)), an inverse quantization processing, an IDCT (Inverse Discrete Cosine Transform) processing, a processing of restoring an intra image, and the like.

The imaging processor 10 performs an imaging processing on the buffer 14 in accordance with an imaging command issued by the CPU 1 every predetermined time interval T (e.g. one frame T=1/60 second).

The buffer 14 is, for example, composed of a RAM and divided into a display area (frame buffer) and a non-display area. The display area is composed of a development area of image data to be displayed on a display surface of the television monitor 21. The non-display area is composed of a storage area for data defining skeletons, model data defining polygons, animation data for causing models to move, pattern data indicating the contents of respective animations, texture data and color palette data and other data.

Here, texture data is two-dimensional image data. The color palette data is data for designating the colors of the texture data and the like. The CPU 1 reads these data at once or in several stages according to a state of progress of a game and stores these data in the non-display area of the buffer 14 beforehand.

Imaging commands include an imaging command for imaging a solid image using polygons and an imaging command for imaging a normal two-dimensional image. Here, polygons are polygonal two-dimensional virtual figures. For example, triangular or rectangular polygons are used.

An imaging command for imaging a solid image using polygons is given for polygon vertex address data indicating stored positions of polygon vertex coordinate data on the display area of the buffer 14, texture address data indicating stored positions of textures to be attached to the polygons on the buffer 14, color pallet address data indicating stored positions of color palette data indicating the colors of the textures on the buffer 14 and luminance data indicating the luminances of the textures.

Out of the above data, the polygon vertex address data on the display area are polygon vertex coordinate data in the two-dimensional space permutated by coordinate transformation of the polygon vertex coordinate data in the three-dimensional space from the CPU 1 based on movement amount data and rotation amount data by the graphic data generation processor 3. The luminance data is determined by the graphic data generation processor 3 based on a distance from a position indicated by the polygon vertical coordinate data from the CPU 1 after the coordinate transformation to a virtually arranged light source.

The polygon vertex address data indicates an address on the display area of the buffer 14. The imaging process 10 performs a processing of writing texture data corresponding to a range of the display area of the buffer 14 indicated by three polygon vertex address data.

An object such as a character in a game space is composed of a plurality of polygons. The CPU 1 stores coordinate data of each polygon in the three-dimensional space in the buffer 14 while relating it to vector data of a corresponding skeleton. Then, the following processing is performed to represent a movement of a character or change a view position viewing the character such as when the character is moved on the display screen of the television monitor 21 by maneuvering the controller 19 to be described.

Specifically, the CPU 1 feeds three-dimensional coordinate data of the vertices of the respective polygons retained in the non-display area of the buffer 14 and movement amount data and rotation amount data of the respective polygons obtained from data on the coordinates and rotation amounts of skeletons to the graphic data generation processor 3.

The graphic data generation processor 3 successively computes three-dimensional coordinate data of the respective polygons after movement and rotation based on the three-dimensional coordinate data of the vertices of the respective polygons and the movement amount data and the rotation amount data of the respective polygons.

Out of the three-dimensional coordinate data of respective polygons obtained in this way, coordinate data in horizontal and vertical directions are supplied to the imaging processor 10 as address data on the display area of the buffer 14, i.e. polygon vertex address data.

The imaging processor 10 writes texture data indicated by texture address data allotted beforehand on a display area of the buffer 14 indicated by three polygon vertex address data. In this way, an object in which textures are attached to a multitude of polygons is displayed on the display screen of the television monitor 21.

The imaging command for imaging a normal two-dimensional image is given for vertex address data, texture address data, color pallet address data indicating stored positions of color palette data indicating the colors of textures on the buffer 14 and luminance data indicating the luminances of the textures. Out of these data, the vertex address data are obtained by coordinate transformation of vertex coordinate data on a two-dimensional plane from the CPU 1 based on movement amount data and rotation amount data from the CPU 1 by the graphic data generation processor 3.

The audio processor 11 stores ADPCM (Adaptive Differential Pulse Code Modulation) data read from the recording medium 300 in the buffer 15 and the ADPCM data stored in the buffer 15 serves as a sound source.

Further, the audio processor 11 reads the ADPCM data from the buffer 15, for example, in accordance with a clock signal having a frequency of 44.1 kHz. The audio processor 11 performs pitch conversion, noise addition, envelope setting, level setting, reverb addition and other processings on the read ADPCM data.

If audio data read from the recording medium 300 is PCM (Pulse Code Modulation) data such as CD-DA (Compact Disk Digital Audio) data, the audio processor 11 converts this audio data into ADPCM data. The PCM data is directly processed on the main memory 5 by a program. The PCM data processed on the main memory 5 is supplied to the audio processor 11 and converted into ADPCM data. Thereafter, various processings described above are performed and sound is output from the speaker 23.

A DVD-ROM drive, a CD-ROM drive, a hard disk drive, an optical disk drive, a flexible disk drive, a silicon disk drive, a cassette medium reader or the like is, for example, used as the recording medium drive 17. In this case, a DVD-ROM, a CD-ROM, a hard disk, an optical disk, a flexible disk, a semiconductor memory or the like is used as the recording medium 300.

The recording medium drive 17 reads image data, audio data and program data from the recording medium 300 and supplies the read data to the decoder 12. The decoder 12 performs an error correction processing using an ECC (Error Correction Code) on the reproduced data from the recording medium drive 17, and supplies the data having the error correction processing performed thereon to the main memory 5 or the audio processor 11.

A card type memory is, for example, used as the memory 18. The card type memory is used to retain various game parameters at the time of interruption such as to retain a state at the time of interruption, for example, when a game is interrupted.

The controller 19 is an operating device used by a game player as an operator to enter various operation commands, and sends an operation command corresponding to the operation of the game player to the CPU 1. The controller 19 includes a first button 19a, a second button 19b, a third button 19c, a fourth button 19d, an UP key 19U, a DOWN key 19D, a LEFT key 19L, a RIGHT key 19R, an L1 button 19L1, an L2 button 19L2, an R1 button 19R1, an R2 button 19R2, a start button 19e, a select button 19f, a left stick 19SL and a right stick 19SR.

The UP key 19U, the DOWN key 19D, the LEFT key 19L and the RIGHT key 19R are used, for example, to give commands to move a character or a cursor upward, downward, leftward and rightward on the screen of the television monitor 21 to the CPU 1.

The start button 19e is used to instruct the CPU 1 to load the game program from the recording medium 300 and other purposes. The select button 19f is used to instruct the CPU 1 to select various items on the game program loaded into the main memory 5 from the recording medium and other purposes.

Each of the respective buttons and keys of the controller 19 excluding the left stick 19SL and the right stick 19SR is an on-off switch which is turned on when being pressed from a neutral position by an external pressing force and returns to the neutral position and is turned off when being freed from the pressing force.

Each of the left stick 19SL and the right stick 19SR is a stick-type controller having substantially the same construction as a so-called joystick. This stick type controller includes an upright stick and is inclinable in any direction in a range of 360° including forward, backward, leftward and rightward directions with a specified position of the stick as a pivot point. Each of the left stick 19SL and the right stick 19SR sends values in an x coordinate in a lateral direction and a y coordinate in forward and backward directions with the upright position as an origin as an operation signal according to a direction of inclination and an angle of inclination of the stick to the CPU 1 via the interface circuit 13.

Note that the first button 19a, the second button 19b, the third button 19c, the fourth button 19d, the L1 button 19L1, the L2 button 19L2, the R1 button 19R1 and the R2 button 19R2 are used for various functions according to the game control program loaded from the recording medium 300.

Next, the operation of the above game system is outlined. When a power switch (not shown) is turned on to power on the game system with the recording medium 300 loaded in the recording medium drive 17, the CPU 1 instructs the recording medium drive 17 to read the game program from the recording medium 300 based on the operating system stored in the ROM 6. This causes the recording medium drive 17 to read image data, audio data and program data from the recording medium 300. The read image data, audio data and program data are supplied to the decoder 12 and the error correction processing is performed on the respective data by the decoder 12.

The image data having the error correction processing performed thereon by the decoder 12 are supplied to the expansion circuit 7 via the bus line 2. The image data having the above expansion processing performed thereon by the expansion circuit 7 are supplied to the imaging processor 10 and written in the non-display area of the buffer 14 by the imaging processor 10. The audio data having the error correction processing performed thereon by the decoder 12 are written in the main memory 5 or in the buffer 15 via the audio processor 11. The program data having the error correction processing performed thereon by the decoder 12 are written in the main memory 5.

Thereafter, the CPU 1 proceeds with the game based on contents instructed by the game control program stored in the main memory 5 and by a game player using the controller 19.

That is, the CPU 1 controls an image processing, an audio processing, an internal processing and the like as needed based on the contents instructed by the game player using the controller 19.

Calculation of coordinates of the respective skeletons or vertex coordinate data of the respective polygons from pattern data corresponding to animation instructed for a character, supply of obtained three-dimensional coordinate data and view position data to the graphic data generation processor 3 and issuance of an imaging command including address data on the display area of the buffer 14 and luminance data obtained by the graphic data generation processor 3 are performed, for example, as controls of the image processing.

Issuance of an audio output command to the audio processor 11 and designation of a level, a reverb and the like are performed, for example, as controls of the audio processing. Calculation according to the operation of the controller 19 and the like are performed, for example, as controls of the internal processing.

Next, a game implemented based on the game program stored in the recording medium 300 is described. The game according to this embodiment is about a baseball game.

Figure 6:
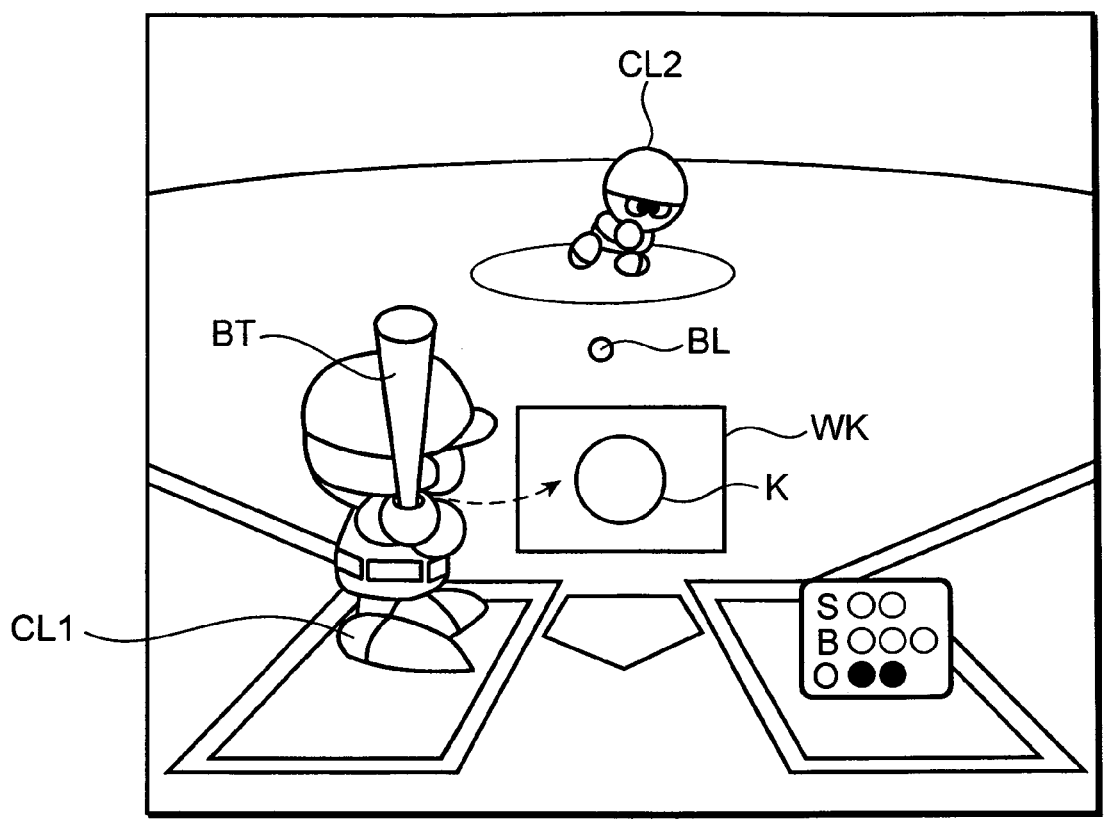
FIG. 6 is a diagram showing a screen used to describe the summary of a baseball game implemented by the game system according to the embodiment.

FIG. 6 is a diagram showing a screen used to describe the summary of the baseball game implemented by the game system according to this embodiment. This baseball game is such that an own team (an example of a group) composed of a manager character (an example of a head character) and player characters (an example of follower characters) which act in accordance with action instructions of the manager character competes with another team (an example of another group) in a game space.

This baseball game is a breeding-type baseball game in which a manager character as a virtual self of a player is bred. That is, the game player increases a manager evaluation value (an example of a first evaluation value) used to evaluate a management ability of the manager character and breeds the manager character by causing his own team compete with another team and win. Player characters include a pitcher character, a batter character and the like.

As shown in FIG. 6, in this baseball game, a pitcher character CL2 throws a ball object BL and a batter character CL1 hits the ball object BL with a bat object BT.

In this baseball game, in offense, the game player moves a meet cursor K displayed in an outer frame WK indicating a strike zone on the display screen, positions the meet cursor K to the ball object BL when the ball object BL reaches the vicinity of a home base and enters a hit command by maneuvering the controller 19. Then, a swing of the bat object BT is displayed and the ball object BL is hit back.

Figure 2:
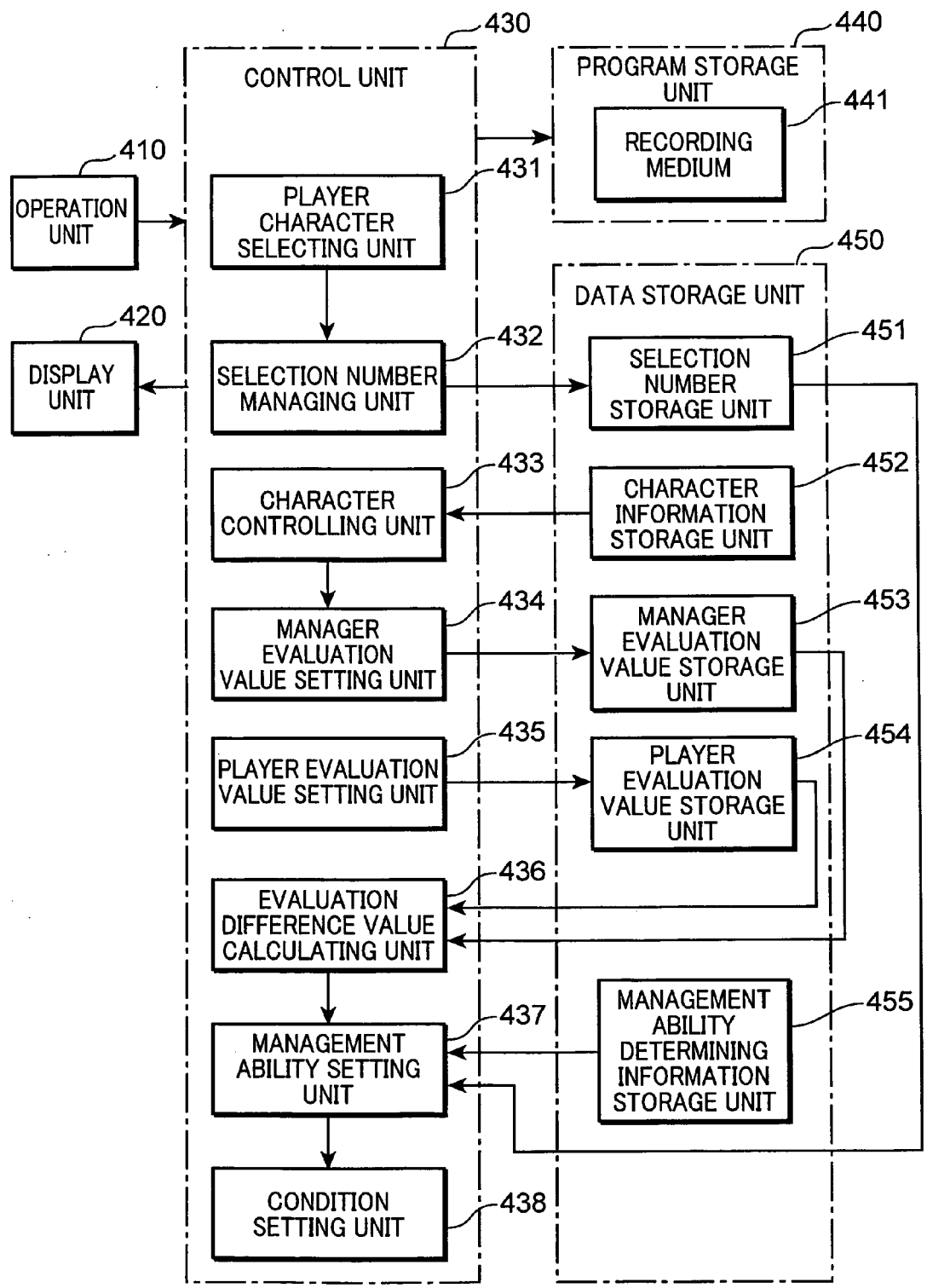
FIG. 2 is a block diagram showing main functions of the game system shown in FIG. 1.

Next, main functions of the game system in the case of playing a baseball game using the game system constructed as described above are described. FIG. 2 is a block diagram showing main functions of the game system shown in FIG. 1.

An operation unit 410 is composed of the controller 19 and the like and receives various operation commands which are necessary as the game player proceeds with the game. The operation commands include a move command, a hit command, a pitch command and action instruction commands and the like.

The move command is an operation command which is entered when the game player is in offense to move the meet cursor K shown in FIG. 6 on the display screen of a display unit 420.

Here, the game player enters the move command, for example, by inclining the left stick 19SL or the right stick 19SR. A move command signal corresponding to the move command and output from the operation unit 410 includes information indicating an inclined direction of the left stick 19SL or the right stick 19SR. For example, a forward or backward inclined direction of the left stick 19SL or the right stick 19SR may be set as a reference direction on a plane where the left stick 19SL or the right stick 19SR stands and a clockwise angle between this reference direction and the inclined direction of the left stick 19SL or the right stick 19SR may be adopted as the information indicating the inclined direction.

The hit command is an operation command which is entered when the game player is in offense to determine a timing of hitting the ball object BL. The game player enters the hit command, for example, by depressing any one of the first to fourth buttons 19a to 19d. The pitch command is an operation command which is entered when the player is in defense to cause the pitcher character CL2 to throw the ball object BL.

The action instruction command is an operation command for causing a player character to act in accordance with an action instruction of the manager character, and this is a command simulating an instruction given by a manager to a player by means of a sign or orally in actual baseball.

In this baseball game, there are action instruction commands to be entered when the player is in offense and those to be entered when the player is in defense. The action instruction commands to be entered when the player is in defense include "hit-and-run", "sacrifice bunt", "squeeze", "base-hit bunt", "fake bunt for base seal", "offense policy/meet oriented", "offense policy/extra-base hit oriented", "offense policy/aggressive", "offense policy/wait-and-see". These action instruction commands are entered by the game player, for example, immediately before the pitcher character CL2 throws the ball object BL.

The action instruction commands to be entered when the player is in defense include "base steal intention/aggressive", "base steal intention/normal", "base steal intention/passive", "base steal intention/ground-and-go", "defensive shift/double play aimed", "defensive shift/bunt cautious", "defensive shift/intermediate defense", "defensive shift/drawn-in defense", "defensive shift/drawn-in outfielder", "defensive shift/extra-base hit cautious", "intentional walk", "bastard play", "base steal cautious", "squeeze cautious", "pitching policy/strike prioritized", "pitching policy/cautious", "pitching policy/strikeout oriented" and "pitching policy/ground ball out". These action instruction commands are entered by the game player, for example, immediately before a pitch command is entered.

All, any one or some of these action instruction commands fall under use limited commands. A use limited command is a command, a use number of which is limited in one match (one game). In this embodiment, there are a plurality of use limited commands. A use number per game is assigned to the game player at the start of the game and decremented by 1 every time any one of the use limited commands is used once. When the use number becomes 0, the game player can no longer use any of the use limited commands. Note that this is only an example and a use number per game may be individually set for each use limited command and the use numbers of the respective use limited commands may be individually managed.

The display unit 420 is composed of the television 200 shown in FIG. 1 and displays various images under the control of a control unit 430.

The control unit 430 is composed of the CPU 1, the graphic data generation processor 3 and the like shown in FIG. 1 and includes a player character selecting unit 431, a selection number managing unit 432, a character controlling unit 433 (an example of a follower character controlling unit), a manager evaluation value setting unit 434 (an example of a first evaluation value setting unit), a player evaluation value setting unit 435 (an example of a second evaluation value setting unit), an evaluation difference value calculating unit 436, a management ability setting unit 437 (an example of a head character management ability setting unit) and a condition setting unit 438.

The player character selecting unit 431 selects player characters used in a match game out of a plurality of predetermined player characters in accordance with selection commands entered by the game player using the operation unit 410.

This baseball game is a baseball game simulating a professional baseball. Accordingly, the game player selects favorite player characters out of the plurality of predetermined player characters simulating actual professional baseball players to organize his own team. Further, the player character selecting unit 431 sets nine player characters as starting members out of the player characters constituting the own team in accordance with selection commands entered by the game player to select the starting members.

The selection number managing unit 432 individually manages a selection number value of each player character selected by the player character selecting unit 431 from the first match of the game player's team to the present. Specifically, the selection number managing unit 432 stores the selection number value corresponding to each player character for each separate game player in a selection number storage unit 451 and, when a certain player character is selected, updates the selection number value of this player character by incrementing it by 1. In this way, even if a plurality of game players select the same player character in the same game system, the selection number values of the respective player characters can be managed for each separate game player. As described later, the higher the selection number value is, the higher an assumed degree of pseudo-intimacy with the manager character is and the more a change rate of a management ability value determined according to an evaluation difference value between the player character and the manager character is relaxed if a player evaluation value is higher than a manager evaluation value.

The character controlling unit 433 determines an action instruction to be given to the player character by the manager character in accordance with an action instruction command the game player entered by maneuvering the operation unit 410, and causes the player character to act in accordance with the determined action instruction.

Here, the character controlling unit 433 may read image data of the player character as an action target from a character information storage unit 452, cause the read image data to make a predetermined movement corresponding to the action instruction command in a game space, and display the player character in an animated manner on the display unit 420 by performing rendering.

Further, the character controlling unit 433 determines a hit timing from an entry timing of a hit command when the hit command is entered to the operation unit 410 and judges that the batter character CL1 succeeded in hitting if the ball object BL overlaps the meet cursor K at the determined hit timing. Then, the character controlling unit 433 determines the speed and trajectory of the hit ball object BL based on an ability value of the batter character CL1 and the overlapping position of the ball object BL and the meet cursor K. Then, the character controlling unit 433 causes the display unit 420 to display the batter character CL1 in an animated manner such that the batter character CL1 displayed on the display unit 420 hits the ball object BL with the bat object BT. Further, the character controlling unit 433 causes the display unit 420 to display the ball object BL in an animated manner such that the ball object BL moves in accordance with the determined trajectory.

For example, if the game player enters an action instruction command "sacrifice bunt" when in offense, the character controlling unit 433 determines by lottery whether or not the batter character CL1 presently up at the batter's box will succeed in sacrifice bunt in accordance with an instruction accomplishment rate of this batter character CL1.

When determining a success in sacrifice bunt by lottery, the character controlling unit 433 determines a hit timing from an entry timing of a hit command entered by the game player and causes the batter character CL1 to make a sacrifice bunt if the ball object BL overlaps the meet cursor K at the determined hit timing. Then, the character controlling unit 433 determines the speed and trajectory of the hit ball object BL from the ability value of the batter character CL1 and the overlapping position of the ball object BL and the meet cursor K. Then, the character controlling unit 433 causes the display unit 420 to display the batter character CL1 displayed on the display unit 420 in such an animated manner as to bunt the ball object BL and display the ball object BL in such an animated manner as to move the along the determined trajectory.

The manager evaluation value setting unit 434 sets a manager evaluation value (an example of a first evaluation value) used to evaluate a management ability of the manager character to manage the player characters. Here, the manager evaluation value setting unit 434 updates the manager evaluation value by increasing the present manager evaluation value stored in a manager evaluation value storage unit 453 by specified points if the game player wins a match against another team. On the other hand, the manager evaluation value setting unit 434 does not increase the present manager evaluation value if the team of the game player loses the match against another team. However, this is only an example and the manager evaluation value setting unit 434 may set an increase in the manager evaluation value when the team of the game player wins a match against another team larger than an increase in the manager evaluation value when the team of the game player loses a match against another team and increase the manager evaluation value every time the game is played.

Note that the manager evaluation value setting unit 434 sets a default value as the manager evaluation value before the game player starts the first game. 0 may be adopted or a predetermined value larger than 0 may be adopted as the default value.

The player evaluation value setting unit 435 sets player evaluation values used to evaluate the player characters based on ability values indicating abilities of the player characters. Here, the player evaluation value setting unit 435 increases the ability values of the player characters according to action results of the player characters and accordingly increases the player evaluation values regardless of whether the team wins or loses the match against another team.

There are three ability values of power, running skill and defensive skill. The ability value in power is an ability value to specify a hitting skill of the player character by a numerical value such as 20 or 100. Accordingly, if a player character with a large ability value in power succeeds in hitting, the moving speed of the hit ball object BL is set to be fast and there is a higher probability of extra-base hit. For pitcher characters CL2, the ability value in power is an ability value to specify the speed of the thrown ball object BL. Thus, the moving speed of the ball object BL of a pitcher character CL2 with a large ability value in power is faster than that of a pitcher character CL2 with a smaller ability value in power.

The ability value in running skill is an ability value to specify the running speed of a player character by a numerical value such as 20 or 100. Accordingly, a player character with a high running skill has a higher probability of hitting an infield hit and a higher probability of succeeding in base steal.

The ability value in defensive skill is an ability value to specify the skill of a player character in defense by a numerical value such as 20 or 100. Accordingly, a player character with a high defensive skill has a higher probability of making a good play such as jumping and catching the hit ball object BL.

The player evaluation value setting unit 435 tallies action results of each player character and increases the ability values in power, running skill and defensive skill by specified points based on the tallied action results, for example, when one game ends. For example, if a certain player character had a hit such as single, double or triple or had a home run, the ability value in power of this player character is increased by specified points according to the number of hits or home runs. Further, if a certain player character succeeded in base steal, the ability value in running skill of this player character is increased by specified points according to the number of successful base steals. Furthermore, if a certain player character succeeded in catching a grounder or fly, the ability value in defensive skill of this player character is increased by specified points according to the number of successful catches.

In this way, the ability values of each player character are increased according to the number of successes in action regardless of the outcome of the game. Since cumulative values from the game player's first game to the present are adopted as these ability values, the game player can individually breed not only the manager character, but also the respective player characters. This can make the game player feel attached to the respective player characters and make the game more interesting and enjoyable.

The player evaluation value setting unit 435 calculates the player evaluation value used to evaluate each player character from the ability values in power, running skill and defensive skill and stores them in a player evaluation value storage unit 454. Here, a value which increases in a stepwise manner according to, for example, an average value of the ability values in power, running skill and defensive skill is, for example, adopted as the player evaluation value. Alternatively, a value which increases in a stepwise manner according to a weighted average value of the ability values in power, running skill and defensive skill using predetermined weight values is adopted as the player evaluation value. Accordingly, the player evaluation value increases as the ability values in power, running skill and defensive skill increase, and a degree of growth of the player character can be known from the player evaluation value. Note that default values corresponding to characteristics of each player character are set as the ability values in power, running skill and defensive skill before the game player plays the first match. For example, a default value of the ability value in power larger than that of an ordinary player character is set for a player character with a high hitting skill.

Note that the player evaluation values are preferably normalized to align a range thereof with that of the manager evaluation value. In this case, a manager evaluation value is obtained by dividing the manager evaluation value calculated as described above by a maximum possible value of the manager evaluation value. Further, a player evaluation value may be obtained by dividing the average value of the ability values of the player character calculated as described above by a maximum possible value of the average value of the ability values of the player character.

The evaluation difference value calculating unit 436 calculates an evaluation difference value indicating a difference between the manager evaluation value and the player evaluation value when the present manager evaluation value of the manager character stored in the manager evaluation value storage unit 453 is smaller than the present player evaluation value stored in the player evaluation value storage unit 454. Here, the evaluation difference value calculating unit 436 calculates an evaluation difference value when a process for determining a use limited command use number, an instruction accomplishment rate determining process and a condition setting process to be described later are performed.

The management ability setting unit 437 sets a management ability value used to reflect the management ability of the manager character on the match game based on the evaluation difference value. Here, the management ability setting unit 437 changes the management ability value to reduce the management ability of the manager character as the evaluation difference value increases. The management ability value includes an instruction accomplishment rate, a command use number decrease value and a condition decrease probability.

The instruction accomplishment rate indicates a probability that an action result of the player character which acts in accordance with an action instruction command ends in success. Here, the larger the evaluation difference value is, the lower the instruction accomplishment rate is set. Thus, in the case of giving an action instruction to the player character having a player evaluation value higher than the manager evaluation value, there is a high probability that the action of this player character ends in failure.

Here, the management ability setting unit 437 determines the instruction accomplishment rate by referring to an instruction accomplishment rate determination table stored in a management ability determining information storage unit 455. FIG. 3 is a table showing an example of data configuration of an instruction accomplishment rate determination table TB1. As shown in FIG. 3, the instruction accomplishment rate determination table TB1 includes a field of the evaluation difference value and a field of the instruction accomplishment rate and specifies the instruction accomplishment rate corresponding to each evaluation difference value.

As shown in FIG. 3, the instruction accomplishment rate is understood to decrease as the evaluation difference value increases. Thus, if the manager character gives an action instruction to a player character having a player evaluation value higher than the manager evaluation value of the manager character, this player character does not act in accordance with the action instruction, whereby the management ability of the manager character can be reflected on the match game.

For example, in the first row record, an instruction accomplishment rate of 90% is set for an evaluation difference value of 1. Thus, if the manager character gives an action instruction to a player character having a player evaluation value higher than the manager evaluation value by 1, the instruction accomplishment rate is set at 90%. In this way, the character controlling unit 433 sets the instruction accomplishment rate at 90%, determines whether or not the player character accomplishes this action instruction by a lottery processing and causes the player character to act in accordance with a lottery result.

On the other hand, if the manager character gives an action instruction to a player character having a player evaluation value lower than the manager evaluation value, the management ability setting unit 437 does not set any instruction accomplishment rate. Thus, the character controlling unit 433 causes the player character to act in accordance with the action instruction of the manager character with a probability of 100%. If a default instruction accomplishment rate is set in an action instruction command, the character controlling unit 433 may determine an instruction accomplishment rate of a player character by multiplying an instruction accomplishment rate set by the management ability setting unit 437 by the default instruction accomplishment rate. This enables the default instruction accomplishment rate to decrease according to the instruction accomplishment rate set in the management ability setting unit 437.

The command use number decrease value indicates a decrease value when the use number of the use limited commands per game is reduced. In this baseball game, the use number of the use limited commands per game is specified beforehand. By reducing this default use number according to the evaluation difference value, the management ability of the manager character is reflected on the match game.

Here, the management ability setting unit 437 determines the decrease value using a decrease value determination table stored in the management ability determining information storage unit 455. FIG. 4 is a table showing an example of data configuration of a decrease value determination table TB2. As shown in FIG. 4, the decrease value determination table TB2 includes a field of the evaluation difference value and a field of the use limited command decrease value and specifies the use limited command decrease value corresponding to each evaluation difference value.

As shown in FIG. 4, the use limited command decrease value is understood to increase as the evaluation difference value increases. For example, the use limited command decrease value corresponding to the evaluation difference value of 1 is set at 1.

The management ability setting unit 437 sets the use limited command use number at 10−1=9 if the default use number of the use limited commands is, for example, 10 when the evaluation difference value is 1. Thus, the game player can use the use limited commands the number of times less than the default use number by 1.

Here, the management ability setting unit 437 may specify player characters having a player evaluation value higher than the manager evaluation value out of the player characters selected by the player character setting unit 431 and used in the match game, calculate evaluation difference values for the respective specified player characters, and specify the total value of the calculated evaluation difference values as an evaluation difference value used in setting the use limited command decrease value.

Thus, if the game player organizes his team by the player characters having a higher player evaluation value than the manager evaluation value, the use limited command use number is reduced. Therefore, a limitation is imposed on the selection of the player characters having higher player evaluation values than the manager evaluation value and a reduction in the management ability of the manager character can be reflected on the match game.

The condition decrease probability indicates a probability of reducing the present condition of the player character set by the condition setting unit 438 to a predetermined level. In this embodiment, the condition decrease probability indicates a probability that the present condition of the player character becomes a very bad condition to be described later.

Here, the management ability setting unit 437 sets the condition decrease probability using a condition decrease probability determination table stored in the management ability determining information storage unit 455. FIG. 5 is a table showing an example of data configuration of a condition decrease probability determination table TB3.

As shown in FIG. 5, the condition decrease probability determination table TB3 includes a field of the evaluation difference value and a field of the condition decrease probability and specifies the condition decrease probability corresponding to each evaluation difference value.

As shown in FIG. 5, the condition decrease probability is understood to increase as the evaluation difference value increases. Thus, if the player character having a player evaluation value higher than the manager evaluation value is used, a probability that the condition of this player character becomes a very bad condition according to the evaluation difference value increases and a reduction in the management ability of the manager character can be reflected on the match game.

The condition setting unit 438 sets the condition of each player character selected by the player character setting unit 431 at the time of starting one game. Here, there are five conditions: top condition, good condition, normal condition, bad condition and very bad condition.

The condition setting unit 438 performs a lottery processing for each player character and determines one condition out of these five conditions. Then, the condition setting unit 438 increases or decreases the present ability values of the player character by a predetermined increase/decrease value according to the one determined condition. For example, if the condition level is normal, the increase/decrease value is 0. Thus, the present ability values of the player character are adopted as they are. Further, if the condition level is good, the increase/decrease value is "+α1". Thus, the present ability values of the player character are increased by α1. Further, if the condition level is bad, the increase/decrease value is "−α1". Thus, the present ability values of the player character are decreased by α1. Further, if the condition level is top, the increase/decrease value is "+α2 (>+α1)". Thus, the present ability values of the player character are increased by α2. Further, if the condition level is very bad, the increase/decrease value is "−α2". Thus, the present ability values of the player character are decreased by α2.

In this way, the condition setting unit 438 can virtually represent the condition of each player character by increasing or decreasing the ability values of each player character according to the condition level. Note that the ability values increased or decreased by the condition setting unit 438 are valid only for one game.

Then, the condition setting unit 438 performs a lottery processing for the player character having the condition decrease probability set by the management ability setting unit 437 to determine whether or not the condition is to become very bad because of the condition decrease probability. Here, the condition setting unit 438 performs a lottery processing similar to that for the player character having a player evaluation value lower than the manager evaluation value and sets the condition of the player character at any one of the above five conditions if the lottery result does not indicate the very bad condition.

The program storage unit 440 is, for example, composed of the recording medium drive 17 and the like and includes a computer-readable recording medium 441. The recording medium 441 is composed of the recording medium 300 and stores the game control program according to the present invention. Note that the main memory 5 functions as the program storage unit 440 when the game control program is read from the recording medium 300 and stored in the main memory 5.

The data storage unit 450 is, for example, composed of the main memory 5 and includes the selection number storage unit 451, the character information storage unit 452, the manager evaluation value storage unit 453, the player evaluation value storage unit 454 and the management ability determining information storage unit 455.

The selection number storage unit 451 stores selection numbers of the respective player characters managed by the selection number managing unit 432. The character information storage unit 452 stores image data of the player characters, the ball object and the manager character and the ability values of the respective player characters set by the player evaluation value setting unit 435.

The manager evaluation value storage unit 453 stores the manager evaluation value set by the manager evaluation value storage unit 434. The player evaluation value storage unit 454 stores the player evaluation values of the respective player characters set by the player evaluation value setting unit 435. The management ability determining information storage unit 455 stores the instruction accomplishment rate determination table TB1, the decrease value determination table TB2 and the condition decrease probability determination table TB3 shown in FIGS. 3 to 5. Further, the management ability determining information storage unit 455 stores relaxing value specification tables TB4 and TB5 shown in FIG. 12 and FIG. 13.

Figure 7:
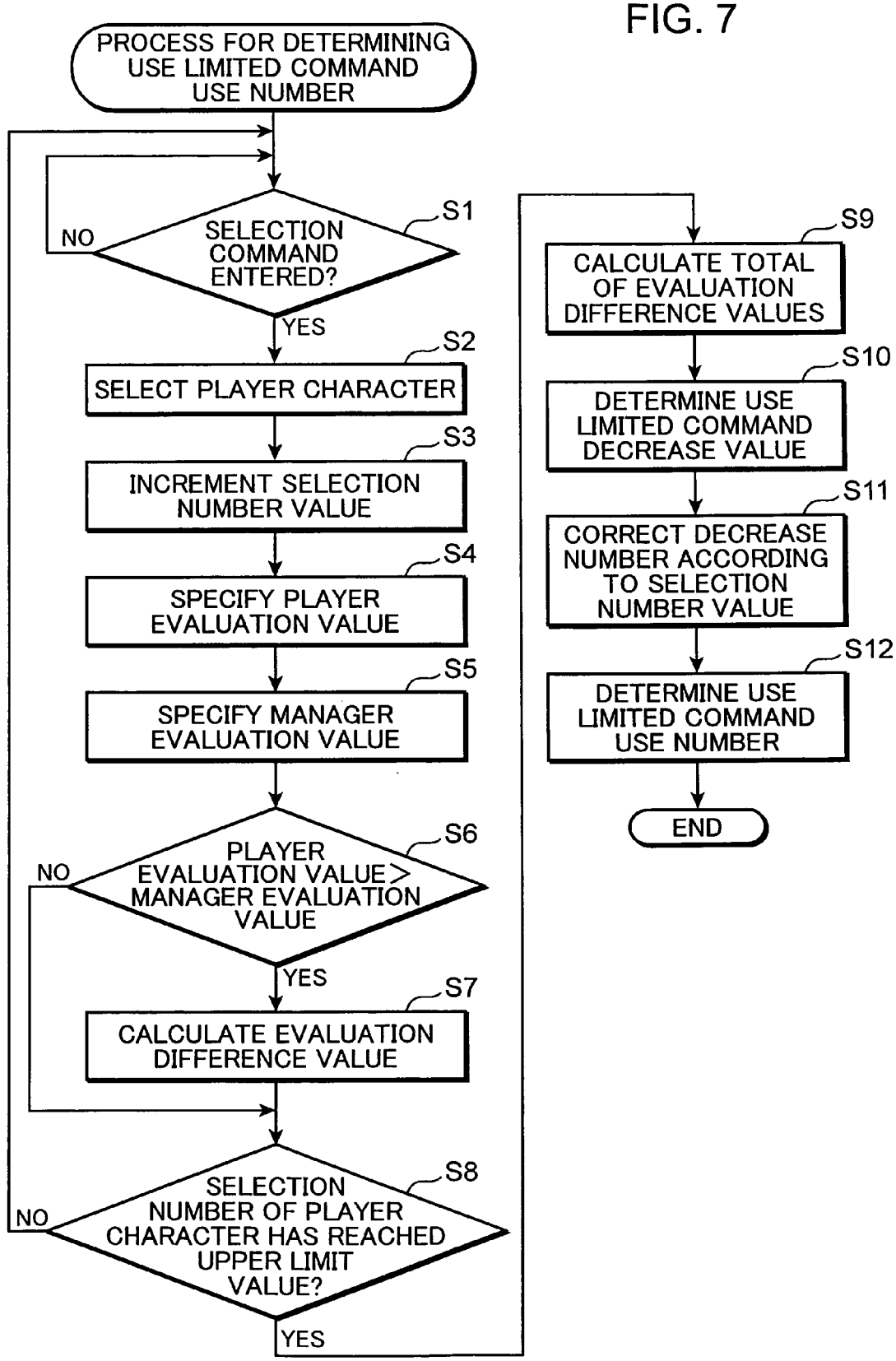
FIG. 7 is a flow chart showing a process of determining a use number of number limiting commands.

FIG. 7 is a flow chart showing the process for determining the use limited command use number. This flow chart is performed when the game player selects player characters constituting his team before the start of a game.

First, when a selection command is entered by the game player to select a player character using the operation unit 410 (YES in Step S1), the selected player character is selected to become a member of the team of the game player (Step S2).

Here, the control unit 430 prompts the game player to select the player character by causing the display unit 420 to display a list of selectable player characters.

On the other hand, if the game player does not enter any selection command (NO in Step S1), the process returns to Step S1. Subsequently, the selection number managing unit 432 increments a selection number value indicating the selection number of the player character selected in Step. S2 from the first match to the present by 1 (Step S3).

Subsequently, the evaluation difference value calculating unit 436 specifies the present player evaluation value of the player character selected in Step S2 by reading it from the player evaluation value storage unit 454 (Step S4). Subsequently, the evaluation difference value calculating unit 436 reads a manager evaluation value of a manager character of the game player from the manager evaluation value storage unit 453 and specifies the present manager evaluation value (Step S5).

Subsequently, the evaluation difference value calculating unit 436 judges whether or not the player evaluation value of the player character selected in Step S2 is higher than the manager evaluation value (Step S6). Then, the evaluation difference value calculating unit 436 calculates an evaluation difference value by subtracting the manager evaluation value from the player evaluation value (Step S7) if player evaluation value>manager evaluation value (YES in Step S6), i.e. the manager character does not have a management ability capable of managing the player character. The calculated evaluation difference value is temporarily stored in the buffer.

On the other hand, the evaluation difference value calculating unit 436 skips the processing in Step S7 if the player evaluation value of the player character selected in Step S2 is equal to or lower than the manager evaluation value (NO in Step S6), i.e. the manager character has a management ability capable of managing the player character.

Subsequently, the management ability setting unit 437 returns the process to Step S1 if the number of the selected player characters has not reached an upper limit value yet (NO in Step S8) and causes the game player to enter a selection command to select another player character. On the other hand, the management ability setting unit 437 advances the process to Step S9 if the number of the selected player characters has reached the upper limit value (YES in Step S8). That is, the player character selecting unit 431 causes the game player to select the player characters until the number of the player characters constituting the team of the game player reaches a specified number. Here, a predetermined integer value at least equal to or greater than 9 is adopted as the specified number.

In Step S9, the management ability setting unit 437 calculates the total value of the evaluation difference values stored in the buffer. That is, the management ability setting unit 437 calculates the total value of the evaluation difference values calculated for the player characters having the player evaluation value higher than the manager evaluation value.

Subsequently, the management ability setting unit 437 determines a use limited command decrease value corresponding to the total value of the evaluation difference values calculated in Step S9 by referring to the decrease value determination table TB2 shown in FIG. 4 (Step S10).

Subsequently, the management ability setting unit 437 reads the selection number values of the respective player characters, for which the evaluation difference values were calculated, from the selection number storage unit 451, obtains a relaxing value of the use limited command decrease value determined in Step S10 according to the read selection number values and corrects the use limited command decrease value by subtracting the relaxing value from the use limited command decrease value (Step S11).

In this case, the management ability setting unit 437 may specify the player character having the maximum selection number value out of the player characters, for which the evaluation difference values were calculated, and specify a relaxing value predetermined according to the selection number value of this player character. Here, the relaxing value is specified using the selection number value of the player character having the maximum selection number value because the use limited commands are set not for the individual player characters, but for one game played by the game player and need to be set based on a specific certain standard. Note that the management ability setting unit 437 may specify the relaxing value using the selection number value of the player character having the minimum selection number value or may specify the relaxing value using an average value of the selection number values of the player characters, for which the evaluation difference values were calculated.

Specifically, the management ability setting unit 437 specifies the relaxing value using the relaxing value specification table TB4 shown in FIG. 12. The relaxing value specification table TB4 includes a field of the selection number value and a field of the relaxing value. As shown in FIG. 12, the relaxing value is set to increase as the selection number value increases. In an example of FIG. 12, the relaxing value is 1 when the selection number value is equal to or above 10 and below 15 and the relaxing value is 2 when the selection number value is equal to or above 15 and below 20. In this way, the relaxing value increases in a stepwise manner according to the selection number value. Further, in the example of FIG. 12, the relaxing value is 10 when the selection number value is equal to or above 55 and does not increase any further. However, numerical values shown in FIG. 12 are merely an example and different numerical values may be adopted as needed. For example, the relaxing value may be specified using a function such as a linear function or a quadratic function of increasing the relaxing value as the selection number value increases instead of using the relaxing value specification table TB4 of FIG. 12. Although the relaxing value does not increase any further with the selection number value of 55 or above in the example of FIG. 12, it may increase even with the selection number value of 55 or above. Further, the relaxing value specification table TB4 may be so set that the relaxing value continuously increases relative to the selection number value.

For example, the selection number value of the player character having the maximum selection number value is assumed to be 16. Then, the management ability setting unit 437 specifies the relaxing value to be 2 by referring to the relaxing value specification table TB4. If the use limited command decrease value determined in Step S10 is 4,4−2=2 is calculated as the use limited command decrease value after correction, thereby relaxing the use limited command decrease value.

If the use limited command decrease value is determined to be 1 by referring to the decrease value determination table TB2 in Step S10 and the relaxing value is determined to be 2 by referring to the relaxing value specification table TB4 in Step S11, the use limited command decrease value after correction is calculated to be 1−2=−1 which is equal to or below −1. If the use limited command decrease value after correction is −1 or less as in this case, the management ability setting unit 437 may set the use limited command decrease value at 0.

By correcting the use limited command decrease value according to the selection number value in this way, the game player can be motivated to continue to use a certain player character. By continuing to use a certain player character, the game player can be made to feel attached to this player character, whereby the game can be made more interesting and enjoyable.

Subsequently, the management ability setting unit 437 sets the use limited command use number by subtracting the use limited command decrease value corrected in Step S11 from the default use number of the use limited commands per game (Step S12). The game player can use the use limited commands the use number of times set in Step S12 in a subsequent game. In the above example, a value of 2 is calculated as the use limited command decrease value in Step S11. Accordingly, if the default use number of the use limited commands is 10, the management ability setting unit 437 sets 10−2=8 as the use limited command use number. In this case, the game player can use the use limited commands only eight times less than ten times as the default use number by two times.

Although the use limited command decrease value is corrected according to the selection number value in Step S11, it may be corrected according to the manager evaluation value of the manager character without being limited to this. In this case, the management ability setting unit 437 may correct the use limited command decrease value by referring to a relaxing value specification table TB5 shown in FIG. 13. The relaxing value specification table TB5 includes a field of the manager evaluation value and a field of the relaxing value. As shown in FIG. 13, the relaxing value is set to increase as the manager evaluation value increases. In an example of FIG.

13, the relaxing value is 1 when the manager evaluation value is equal to or above 100 and below 110 and the relaxing value is 2 when the manager evaluation value is equal to or above 110 and below 120. In this way, the relaxing value increases in a stepwise manner according to the manager evaluation value. Further, in the example of FIG. 13, the relaxing value is 10 when the manager evaluation value is equal to or above 220 and does not increase any further. However, numerical values shown in FIG. 13 are merely an example and different numerical values may be adopted as needed. For example, the relaxing value may be specified using a function such as a linear function or a quadratic function of increasing the relaxing value as the manager evaluation value increases instead of using the relaxing value specification table TB5 of FIG. 13. Although the relaxing value does not increase any further with the manager evaluation value of 220 or above in the example of FIG. 13, it may increase even with the manager evaluation value of 220 or above. Further, the relaxing value specification table TB5 may be so set that the relaxing value continuously increases relative to the manager evaluation value.

For example, the manager evaluation value is assumed to be 115. Then, the management ability setting unit 437 specifies the relaxing value to be 2 by referring to the relaxing value specification table TB5. If the use limited command decrease value determined in Step S10 is 4, 4−2=2 is calculated as the use limited command decrease value after correction, thereby relaxing the use limited command decrease value.

Since the use limited command decrease value is relaxed as the manager evaluation value increases in this way if the manager evaluation value reaches a given value (100 in the example of FIG. 13), the game player can be motivated to increase the manager evaluation value by winning the match, whereby the game can be made more interesting and enjoyable.

Figure 8:
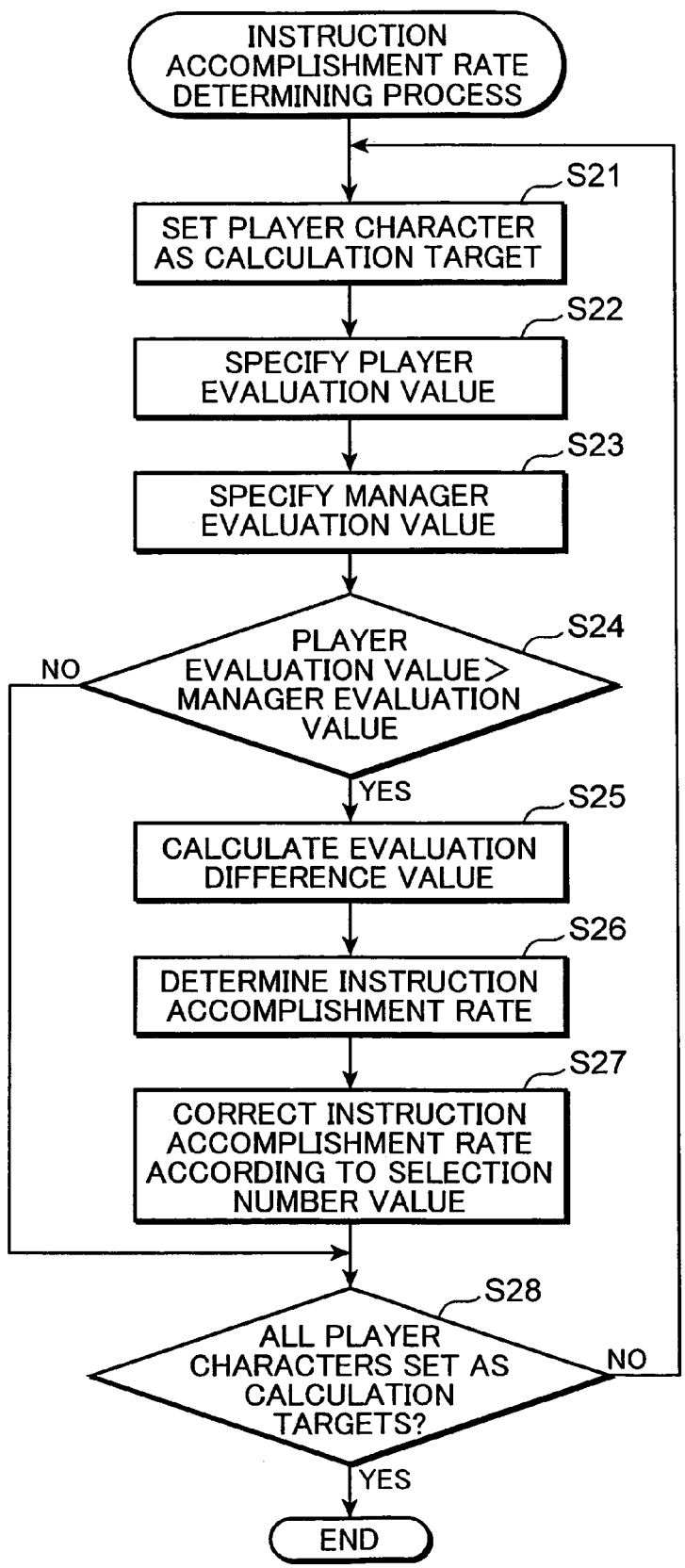
FIG. 8 is a flow chart showing an instruction accomplishment rate determining process.

FIG. 8 shows a flow chart of the instruction accomplishment rate determining process. The instruction accomplishment rate determining process is performed for each determined player character after the process shown in FIG. 7 is performed to determine the player characters constituting the team and before the start of the game.

First, the management ability setting unit 437 sets the player character, for which the instruction accomplishment rate is to be calculated, out of the player characters selected by the game player (Step S21). Here, the management ability setting unit 437 may set the player character as a calculation target according to an order of selection by the game player.

Subsequently, the management ability setting unit 437 reads the player evaluation value of the player character set as the calculation target from the player evaluation value storage unit 454 and specifies the present player evaluation value of the player character (Step S22).

Subsequently, the management ability setting unit 437 reads the manager evaluation value from the manager evaluation value storage unit 453 and specifies the present manager evaluation value of the manager character (Step S23). Subsequently, the management ability setting unit 437 judges whether or not the player evaluation value is higher than the manager evaluation value (Step S24) and advances the process to Step S25 because an instruction accomplishment rate needs to be determined for this player character if player evaluation value>manager evaluation value (YES in Step S24).

On the other hand, the management ability setting unit 437 advances the process to Step S28 because the instruction accomplishment rate needs not be determined for this player character if the player evaluation value is equal to or below the manager evaluation value (NO in Step S24).

Subsequently, the management ability setting unit 437 calculates an evaluation difference value by subtracting the manager evaluation value from the player evaluation value (Step S25). Subsequently, the management ability setting unit 437 determines an instruction accomplishment rate corresponding to the evaluation difference value by referring to the instruction accomplishment rate determination table TB1 shown in FIG. 3 (Step S26).

Subsequently, the management ability setting unit 437 corrects the instruction accomplishment rate according to the selection number value of the player character (Step S27). Here, the management ability setting unit 437 determines a relaxing value for the instruction accomplishment rate predetermined according to the selection number value of the player character and corrects the instruction accomplishment rate by adding the relaxing value to the instruction accomplishment rate determined in Step S26.

In this case, the management ability setting unit 437 may specify the relaxing value using the data of the relaxing value specification table TB4 shown in FIG. 12. As shown in FIG. 12, the relaxing value is set to increase as the selection number value increases. Although the relaxing value specification table TB4 is used in setting a number for suppressing the use limited command decrease value, the data of this table can also be used to correct the instruction accomplishment rate.

For example, the selection number value of a certain player character is assumed to be 16. Then, the management ability setting unit 437 specifies the relaxing value to be 2 by referring to the relaxing value specification table TB4. In the case of correcting the instruction accomplishment rate, a numerical value obtained by multiplying this relaxing value by a predetermined coefficient (e.g. 1.5) is set as a relaxing value. If the instruction accomplishment rate determined in Step S26 is assumed to be 80, an instruction accomplishment rate after correction is calculated to be 80+3=83, whereby the instruction accomplishment rate is slightly increased.

Although the relaxing value specification table TB4 is used above for the correction of the instruction accomplishment rate, a table used to correct the instruction accomplishment rate may be separately provided as a matter of course.

This increases the instruction accomplishment rate of the player character having a large selection number value, with the result that a probability of failing action instructions of the manager character decreases. Accordingly, the game player can be motivated to continue to use a certain player character and made to feel attached to this player character, whereby the game can be made more interesting and enjoyable.

If the instruction accomplishment rate becomes larger than 100 as a result of adding the relaxing value to the instruction accomplishment rate determined in Step S26, the management ability setting unit 437 may set the instruction accomplishment rate after correction at 100.

Subsequently, the management ability setting unit 437 ends the process if all the player characters selected by the game player are set as calculation targets (YES in Step S28). On the other hand, the management ability setting unit 437 returns the process to Step S21 to set the next player character as the calculation target unless all the player characters selected by the game player are set as the calculation targets (NO in Step S28).

Although the instruction accomplishment rate is corrected according to the selection number value in Step S27, it may be corrected according to the manager evaluation value of the manager character without being limited to this. In this case, the management ability setting unit 437 may obtain a relaxing value corresponding to the manager evaluation value by referring to the relaxing value specification table TB5 shown in FIG. 13 and correct the instruction accomplishment rate by adding the relaxing value to the instruction accomplishment rate. In this way, the game player can be motivated to increase the manager evaluation value by winning the match, whereby the game can be made more interesting and enjoyable.

Figure 9:
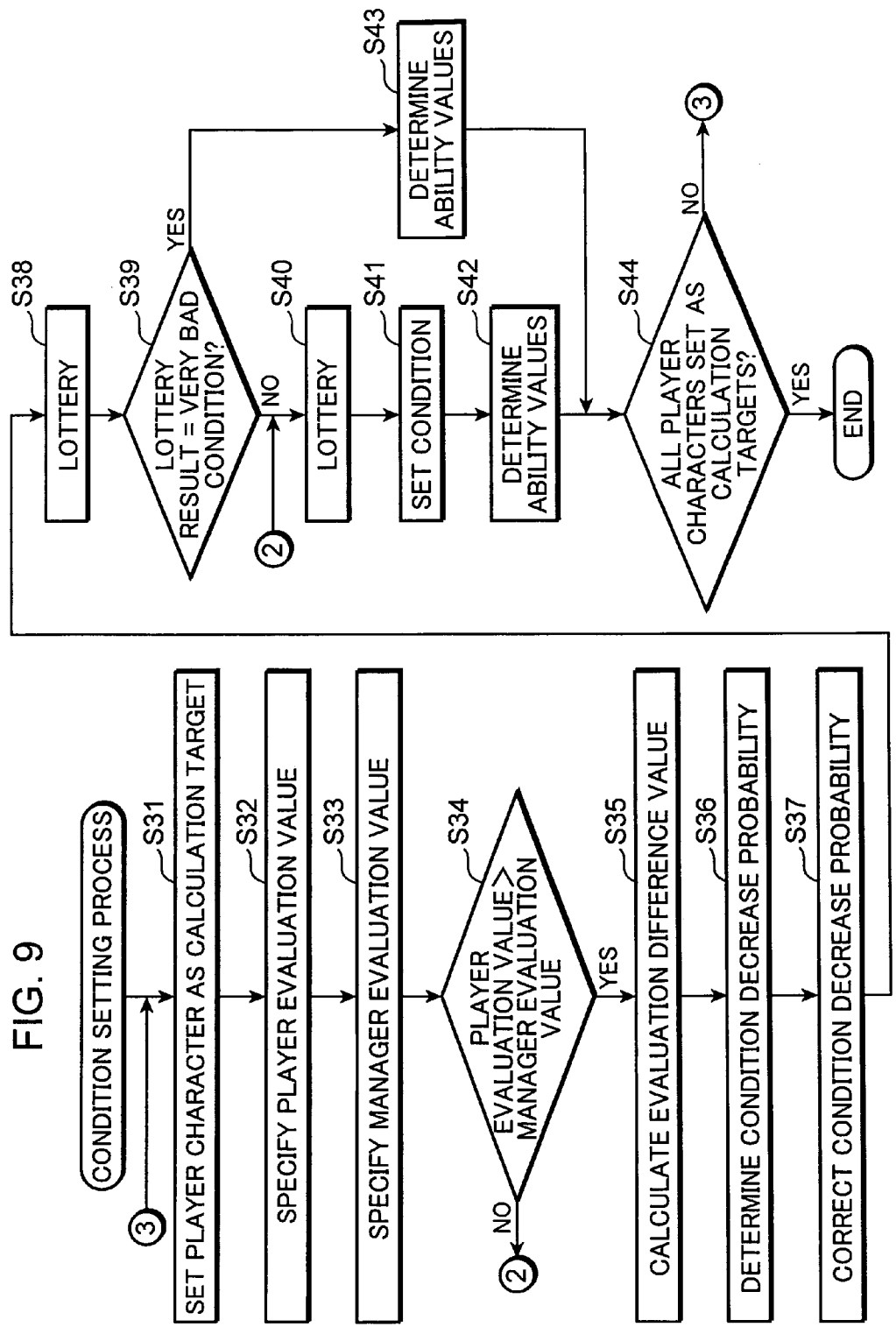
FIG. 9 is a flow chart showing a condition setting process.

FIG. 9 is a flow chart showing the condition setting process. The condition setting process is performed for each determined player character after the process shown in FIG. 8 is performed and before the game is started. Since processings in Steps S31 to S35 are the same as those in Steps S21 to S25 shown in FIG. 8, they are not described. In Step S36, the management ability setting unit 437 determines a condition decrease probability corresponding to the evaluation difference value by referring to the condition decrease probability determination table TB3 shown in FIG. 5.

Subsequently, the management ability setting unit 437 corrects the condition decrease probability determined according to the evaluation difference value according to the use number value of the player character (Step S37). In this case, the management ability setting unit 437 specifies a relaxing value corresponding to the use number value using the relaxing value specification table TB4 shown in FIG. 12 and corrects the condition decrease probability determined according to the evaluation difference value by subtracting the relaxing value from the condition decrease probability.

For example, the selection number value of a certain player character is assumed to be 16. Then, the management ability setting unit 437 specifies the relaxing value to be 2 by referring to the relaxing value specification table TB4. If the condition decrease probability determined in Step S36 is 20, 20−2=18 is calculated as the condition decrease probability after correction and the condition decrease probability is slightly decreased. Note that, similar to a technique described with respect to the instruction accomplishment rate, the data of the relaxing value specification table TB4 may be converted by being multiplied by a predetermined coefficient and data after conversion may be used as a relaxing value instead of using the data of the relaxing value specification table TB4 as it is.

Thus, if the use number value is large even if the player character has a higher player evaluation value than the manager evaluation value, the condition decrease probability becomes lower than that determined by the condition decrease probability determination table TB3 and a probability that the condition becomes a very bad condition is relaxed. As a result, the game player can be motivated to continue to use a certain player character and made to feel attached to this player character, whereby the game can be made more interesting and enjoyable.

Note that the condition decrease probability may be corrected according to the manager evaluation value of the manager character in Step S37. In this case, the management ability setting unit 437 may obtain a relaxing value corresponding to the manager evaluation value by referring to the relaxing value specification table TB5 shown in FIG. 13 and correct the condition decrease probability determined in Step S36 by subtracting the relaxing value from the condition decrease probability. In this way, the game player can be motivated to increase the manager evaluation value by winning the match, whereby the game can be made more interesting and enjoyable.

Next, the condition setting unit 438 performs a lottery processing using the condition decrease probability (Step S38) and determines whether or not the condition of the player character as the calculation target is to be made very bad.

Subsequently, the condition setting unit 438 determines the ability values of the player character by subtracting α2 from the ability values of the player character (Step S43) if the result of the lottery processing in Step S38 indicates a very bad condition (YES in Step S39).

On the other hand, the condition setting unit 438 performs the lottery processing again (Step S40) and sets the condition of the player character at any one of the five conditions from the top condition to the very bad condition (Step S41) if the result of the lottery processing in Step S38 does not indicate a very bad condition (NO in Step S39). Here, the condition setting unit 438 may randomly determine one condition out of the five conditions.

Subsequently, the condition setting unit 438 determines the ability values of the player character by increasing or decreasing the ability values of the player character by an increase/decrease value corresponding to the set condition (Step S42).

Note that only the lottery processing in Step S40 is performed for the player character judged to be NO in Step S34, i.e. the player character having a player evaluation value equal to or lower than the manager evaluation value, and one condition is determined out of the five conditions from the top condition to the very bad condition.

If all the player characters are set as calculation targets in Step S44 (YES in Step S44), the process ends. On the other hand, the process is returned to Step S31 to set the next player character as a calculation target unless all the player characters selected by the game player are set as the calculation targets (NO in Step S44).

Figure 10:
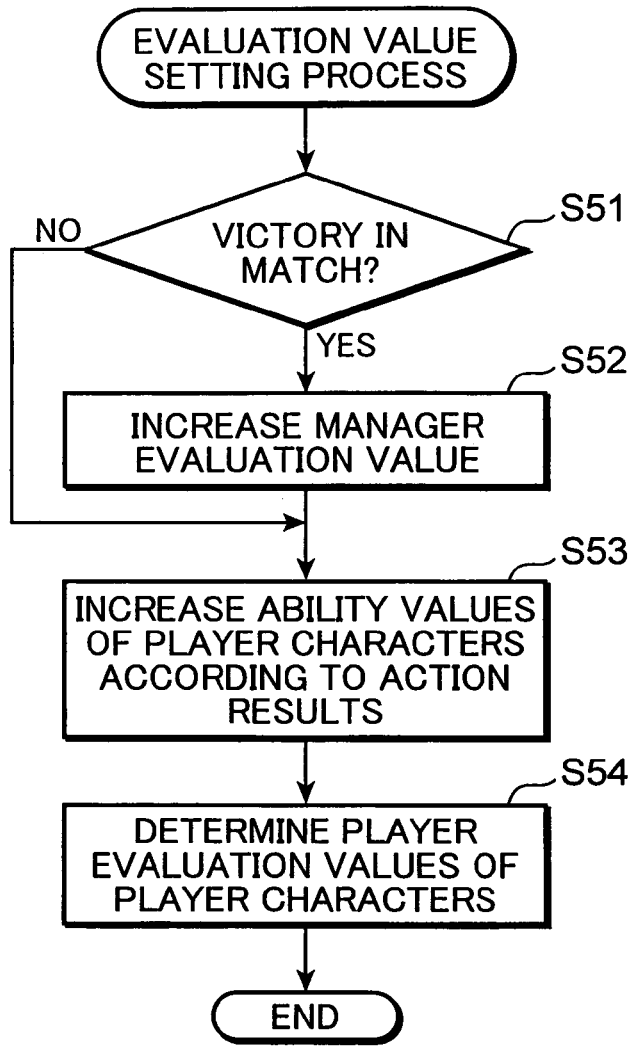
FIG. 10 is a flow chart showing an evaluation value setting process.

FIG. 10 is a flow chart showing the evaluation value setting process. This evaluation value setting process is performed every time one match ends. First, if the game player wins the match (YES in Step S51), the manager evaluation value setting unit 434 increases the manager evaluation value by specified points (Step S52). On the other hand, if the game player loses the match (NO in Step S51), the manager evaluation value setting unit 434 advances the process to Step S53 without increasing the manager evaluation value.

In Step S53, the player evaluation value setting unit 435 increases the ability values (power, running skill and defensive skill) of each player character from a tally value of action results of the action instruction commands of each player character in the game that ended.

Subsequently, the player evaluation value setting unit 435 determines the player evaluation value of each player character according to the ability values increased in Step S53 (Step S54). Here, the player evaluation value setting unit 435 increases the player evaluation value by one level, for example, if an average value of the ability values in power, running skill and defensive skill has reached a certain value.

Figure 11:
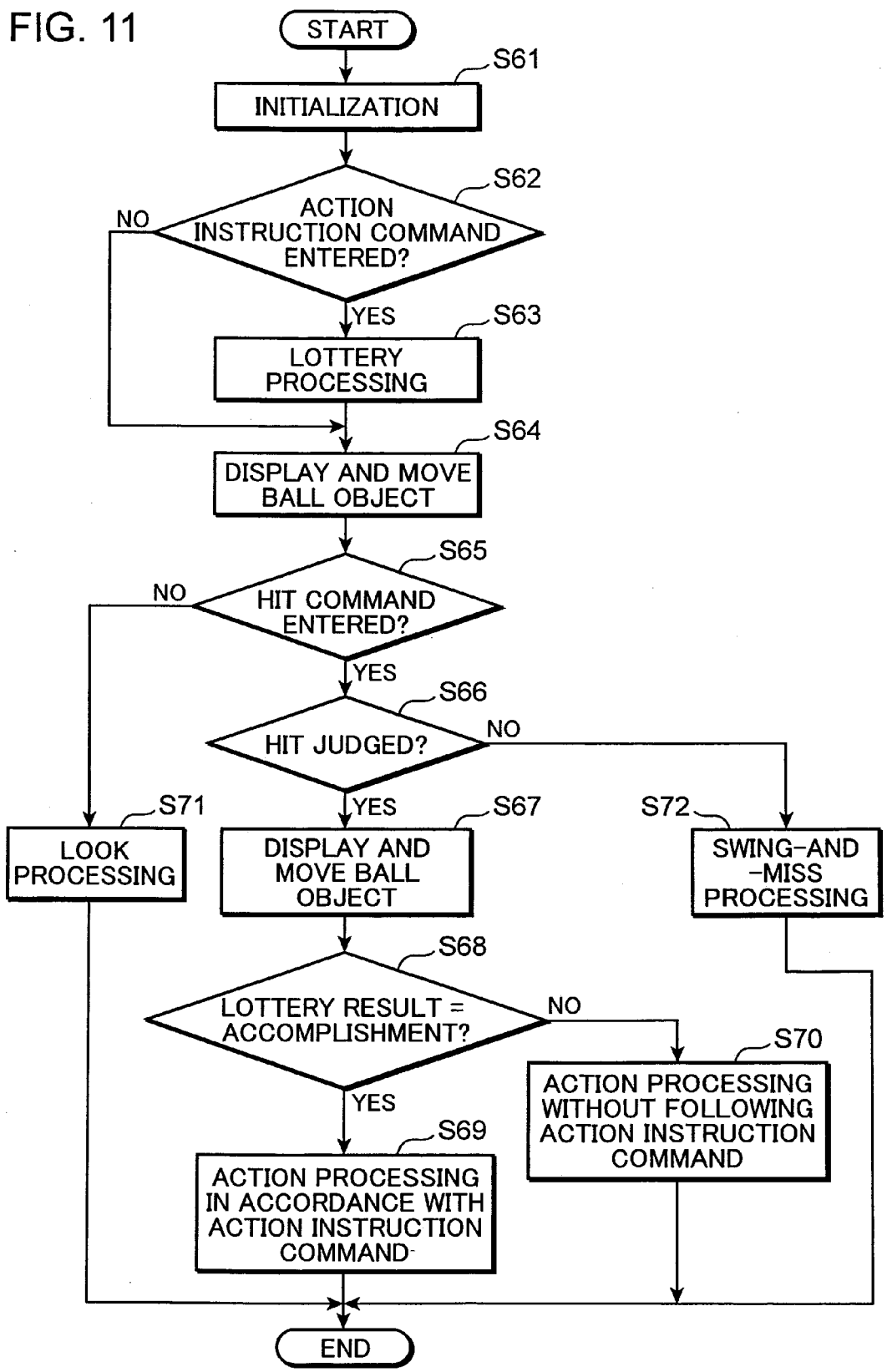
FIG. 11 is a flow chart showing a process of the game system when a batter character hits a ball object.

FIG. 11 is a flow chart showing a process of the game system when a baseball game is started and the battery character CL1 hits the ball object BL. This flow chart shows a process when the player is in offense and the game system is in defense. First, in Step S61, the control unit 430 performs initialization by reading the image data such as the meet cursor K, the batter character CL1, the ball object BT, a background image of a baseball stadium, a pitcher character CL2, fielder characters and the like from the character information storage 452 and causing the display unit 420 to display them. In this case, an image as shown in FIG. 6 is, for example, displayed on the display unit 420.

Subsequently, when an action instruction command is entered by the game player (YES in Step S62), the control unit 430 performs a lottery processing with a lottery probability indicated by the instruction accomplishment rate set for each player character and determines whether or not to cause the player character to accomplish the action instruction command (Step S63).

Subsequently, the control unit 430 sets a trajectory of the ball object BL, causes the pitcher character CL2 to throw the ball object BL and causes the display unit 420 to display the ball object BL to move along the set trajectory (Step S64) when a predetermined pitching start timing is reached. In this case, as shown in FIG. 6, the ball object BL is displayed to move from the pitcher character CL2 toward the home base.

Subsequently, when the operation unit 410 receives the entry of a hit command from the game player (YES in Step S65), the control unit 430 determines a hit timing from the entry timing of the hit command and judges whether or not the batter character CL1 could hit the ball object BL based on whether or not the meet cursor K overlaps the ball object BL at the hit timing (Step S66).

Subsequently, the control unit 430 determines the speed and trajectory of the ball object BL after hitting from the ability value in power of the batter character CL1 and the overlapping position of the meet cursor K and the ball object BL and causes the ball object BL to be displayed to move in accordance with the determined speed and trajectory (Step S67) if judging that the batter character CL1 could hit the ball object BL (YES in Step S66). In this case, the ability value in power determined by the condition setting process shown in FIG. 9 is adopted as the ability value in power.

Subsequently, the control unit 430 causes the batter character CL1 and related player characters to act (S69) if the lottery result in Step S63 indicates that "the batter character CL1 is caused to act in accordance with the action instruction command" (YES in Step S68). For example, if the action instruction command is to squeeze, the batter character CL1 is caused to squeeze and the player character on the third base is caused to reach home. In this way, actions in accordance with the action instruction command are made by the player characters.

On the other hand, if the lottery result in Step S63 indicates that "the batter character CL1 is not caused to act in accordance with the action instruction command" (NO in Step S68), the control unit 430 does not cause the batter character CL1 and related player characters to act (Step S70). For example, if the action instruction command is to squeeze, the player character on the third base is tagged by a catcher character near the home base and cannot reach home.

If the game player does not enter any hit command (NO in Step S65), i.e. the batter character CL1 looks the ball object BL, a look processing of causing the display unit 420 to display, for example, an image in which the catcher character catches the ball object BL is performed (Step S71).

If the control unit 430 judges that the batter character CL1 failed in hitting in Step S66 (NO in Step S66), i.e. the batter character CL1 missed the ball object BL, a swing-and-miss processing of causing the display unit 420 to display an image in which the ball object BL is caught by the catcher character on the display unit 420 after the display of an image in which the pitcher object gets the bat object swinging on the display unit 420 is performed (Step S72).

In the above embodiment, the process for reducing the use limited command use number shown in FIG. 4 or the process for reducing the condition of the player character shown in FIG. 5 is performed in addition to the process for reducing the instruction accomplishment rate shown in FIG. 3 when the manager evaluation value is lower than the player evaluation value. However, the reduction of the use limited condition use number and/or the reduction of the conditions of the player characters may be omitted.

Further, although the above embodiment is described, taking the baseball game as an example, the present invention may also be applied to a soccer game, a hockey game, a rugby game, an American football game or the like without being limited to this. That is, the present invention relates to a breeding type match game in which a manager character as a virtual self of a game player is bred and is applicable to a match game in which player characters act under instructions of a manager character.

Technical features of the above game control system is summarized as follows.

(1) The above game system is a game control system for controlling the progress of a match game in which a group composed of a head character and a follower character which acts in accordance with action instructions of the head character competes with another group in a game space and includes a follower character controlling unit for determining an action instruction to be given to the follower character by the head character in accordance with an operation command entered by a game player using an operation unit and causing the follower character to act in accordance with determined the action instruction; a first evaluation value setting unit for setting a first evaluation value used to evaluate a management ability of the head character to manage the follower character; a second evaluation value setting unit for setting a second evaluation value used to evaluate the follower character based on an ability value indicating an ability of the follower character; an evaluation difference value calculating unit for calculating an evaluation difference value indicating a difference between the first and second evaluation values when the first evaluation value is lower than the second evaluation value; and a head character management ability setting unit for setting a management ability value used to reflect the management ability on the match game based on the evaluation difference value, the head character management ability setting unit changing the management ability value to reduce the management ability of the head character as the evaluation difference value increases.

According to this construction, if the first evaluation value used to evaluate the management ability of the head character (e.g. manager character in a baseball game) is lower than the second evaluation value specified from the ability value of the follower character (e.g. player character in a baseball game), the evaluation difference value indicating the difference between the two evaluation values is calculated. The management ability value used to reflect the management ability of the head character on the game is changed to reduce the management ability as this evaluation difference value increases.

Accordingly, if the game player uses a follower character having a higher evaluation value than the head character, a probability that the follower character acts without following the action instruction of the head character increases. Thus, an unpredictable element that a player does not act in accordance with an instruction of a manager according to a power relationship between the manager and the player as in actual baseball can be incorporated into the game, and it is possible to provide a nonconventional and highly interesting and enjoyable game.

(2) The head character management ability setting unit preferably reduces an instruction accomplishment rate of the follower character in response to an action instruction of the head character as the evaluation difference value increases.

According to this construction, the instruction accomplishment rate of the follower character is reduced if the evaluation value of the head character is lower than that of the follower character. Thus, if the head character gives an action instruction to the follower character having a higher evaluation value than the head character, a probability that an action of the follower character in response to this action instruction ends in failure increases. Therefore, a reduction in the management ability of the head character can be effectively reproduced.

(3) Preferably, the first evaluation value setting unit increases the first evaluation value in the case of victory in the match against the other group; and the head character management ability setting unit relaxes a change rate of the management ability value determined according to the evaluation difference value as the first evaluation difference value increases.

According to this construction, the change rate of the management ability value determined according to the evaluation difference value is relaxed when the first evaluation value is high and the head character has a high management ability. Thus, if the head character having a high management ability gives an action instruction to the follower character having a higher evaluation value than the head character, a probability that the follower character acts in accordance with the action instruction increases as compared with the case where the head character having a low management ability gives an action instruction to the follower character having a higher evaluation value than the head character. This can clearly motivate the game player to increase the evaluation value of the head character by winning the match (e.g. to improve the ability of the manager character by winning many times in the baseball game), whereby the game can be made more interesting and enjoyable.

Further, since it is necessary to reduce a difference in the evaluation value between the head character and the follower character and increase the evaluation value of the head character to cause an excellent follower character having a high evaluation value to act as instructed, the game player can be clearly motivated to win the match against the other group, whereby the game can be made more interesting and enjoyable.

(4) Preferably, there are a plurality of follower characters; the game control system further includes a follower character selecting unit for selecting the follower character to be used in the match game out of the plurality of follower characters in accordance with a selection command from the game player and a selection number managing unit for managing a selection number indicating how many times the follower character has been selected by the follower character selecting unit for each follower character; and the head character management ability setting unit relaxes a change rate of the management ability value determined according to the evaluation difference value more for the follower character having a larger selection number.

According to this construction, even if the head character gives an action instruction to the follower character having a higher evaluation value than the head character, the change rate of the management ability value is relaxed if the selection number indicating selection of the follower character by the game player is large. A case where this construction is incorporated into a baseball game is specifically described as an example. In the present invention, when a manager character uses a player character having a high ability, this player character may not possibly follow an instruction of the manager character. Even in this case, a degree of pseudo intimacy between the manager character and the player character is assumed to be high and a probability that the player character does not follow an instruction of the manager character is reduced if the manager character has selected this player character as a starting member or a game participating member many times. This can motivate the game player to repeatedly select a specific follower character and make the game player feel attached to this follower character, whereby the game can be made more interesting and enjoyable.

(5) Preferably, the operation command includes a use limited command, a use number of which in one match game is limited beforehand; and the head character management ability setting unit reduces the use number of the use limited command as the evaluation difference value increases.

According to this construction, since the use number of the use limited command is reduced if the game player gives an instruction to the follower character having a higher evaluation value than the head character, a limitation is imposed on the use of the follower character having a large evaluation value than the head character and a reduction in the management ability of the head character can be naturally reflected on the game.

(6) Preferably, the game control system further includes a condition setting unit for increasing or decreasing the ability value of the follower character to virtually show a condition of the follower character in starting one match game; and the head character management ability setting unit increases a probability of reducing the ability value of the follower character by the condition setting unit according to the evaluation difference value.

According to this construction, if the head character gives an instruction to the follower character having a higher evaluation value than the head character, a probability of reducing the ability value of the follower character is increased and a reduction in the management ability of the head character can be effectively reflected.

(7) The second evaluation value setting unit increases the ability value of the follower character according to an action result of the follower character regardless of the outcome of the match against the other group.

According to this construction, since the game player can individually breed the respective follower characters, he can be made to feel attached to each follower character, whereby the game can be made more interesting and enjoyable.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A game control device for controlling the progress of a match game in which a group composed of a head character and a follower character which acts in accordance with action instructions of the head character competes with another group in a game space, comprising:

a follower character controlling unit for determining an action instruction to be given to the follower character by the head character in accordance with an operation command entered by a game player using an operation unit and causing the follower character to act in accordance with determined the action instruction;

a first evaluation value setting unit for setting a first evaluation value used to evaluate a management ability of the head character to manage the follower character;

a second evaluation value setting unit for setting a second evaluation value used to evaluate the follower character based on an ability value indicating an ability of the follower character;

an evaluation difference value calculating unit for calculating an evaluation difference value indicating a difference between the first and second evaluation values when the first evaluation value is lower than the second evaluation value;

a head character management ability setting unit for setting a management ability value used to reflect the management ability on the match game based on the evaluation difference value, the head character management ability setting unit changing the management ability value to reduce the management ability of the head character as the evaluation difference value increases; and a management ability information storage unit for storing a management ability determination table in which a plurality of the evaluation difference values are respectively associated with a plurality of reduction amounts of the management ability value such that a higher the reduction amount of the management ability value the higher the evaluation difference value; and wherein the head character management ability setting unit specifies, from among the reduction amounts of the management ability value in the management ability determination table, a reduction amount of the management ability value corresponding to an evaluation difference value calculated by the evaluation difference value calculating unit, and reduces the management ability value by the specified reduction amount of the management ability value.

2. A game control device according to claim 1, wherein the head character management ability setting unit reduces an instruction accomplishment rate of the follower character in response to an action instruction of the head character as the evaluation difference value increases.

3. A game control device according to claim 1,
wherein the first evaluation value setting unit increases the first evaluation value in the case of victory in the match against the other group; and
wherein the head character management ability setting unit relaxes a change rate of the management ability value determined according to the evaluation difference value as the first evaluation difference value increases.

4. A game control device according to claim 1, wherein there are a plurality of follower characters; and wherein the game control system further comprises:
a follower character selecting unit for selecting the follower character to be used in the match game out of the plurality of follower characters in accordance with a selection command from the game player; and
a selection number managing unit for managing a selection number indicating how many times the follower character has been selected by the follower character selecting unit for each follower character; and
wherein the head character management ability setting unit relaxes a change rate of the management ability value determined according to the evaluation difference value more for the follower character having a larger selection number.

5. A game control device according to claim 1,
wherein the operation command includes a use limited command, a use number of which in one match game is limited beforehand; and wherein the head character management ability setting unit reduces the use number of the use limited command as the evaluation difference value increases.

6. A game control device according to claim 1, further comprising:
a condition setting unit for increasing or decreasing the ability value of the follower character to virtually show a condition of the follower character in starting one match game; and
wherein the head character management ability setting unit increases a probability of reducing the ability value of the follower character by the condition setting unit according to the evaluation difference value.

7. A game control device according to claim 1, wherein the second evaluation value setting unit increases the ability value of the follower character according to an action result of the follower character regardless of the outcome of the match against the other group.

8. A non-transitory computer-readable recording medium storing a game control program for causing a computer to function as a game control system for controlling the progress of a match game in which a group composed of a head character and a follower character which acts in accordance with action instructions of the head character competes with another group in a game space, wherein the computer is caused to function as:
a follower character controlling unit for determining an action instruction to be given to the follower character by the head character in accordance with an operation command entered by a game player using an operation unit and causing the follower character to act in accordance with determined the action instruction;
a first evaluation value setting unit for setting a first evaluation value used to evaluate a management ability of the head character to manage the follower character;
a second evaluation value setting unit for setting a second evaluation value used to evaluate the follower character based on an ability value indicating an ability of the follower character;
an evaluation difference value calculating unit for calculating an evaluation difference value indicating a difference between the first and second evaluation values when the first evaluation value is lower than the second evaluation value;
a head character management ability setting unit for setting a management ability value used to reflect the management ability on the match game based on the evaluation difference value, the head character management ability setting unit changing the management ability value to reduce the management ability of the head character as the evaluation difference value increases; and
a management ability information storage unit for storing a management ability determination table in which a plurality of the evaluation difference values are respectively associated with a plurality of reduction amounts of the management ability value such that a higher the reduction amount of the management ability value the higher the evaluation difference value; and
wherein the head character management ability setting unit specifies, from among the reduction amounts of the management ability value in the management ability determination table, a reduction amount of the management ability value corresponding to an evaluation difference value calculated by the evaluation difference value calculating unit, and reduces the management ability value by the specified reduction amount of the management ability value.

9. A game control method by which a computer controls the progress of a match game in which a group composed of a head character and a follower character which acts in accordance with action instructions of the head character competes with another group in a game space, the method comprising:
- a follower character controlling step in which the computer determines an action instruction to be given to the follower character by the head character in accordance with an operation command entered by a game player using an operation unit and causes the follower character to act in accordance with determined the action instruction;
- a first evaluation value setting step in which the computer sets a first evaluation value used to evaluate a management ability of the head character to manage the follower character;
- a second evaluation value setting step in which the computer sets a second evaluation value used to evaluate the follower character based on an ability value indicating an ability of the follower character;
- an evaluation difference value calculating step in which the computer calculates an evaluation difference value indicating a difference between the first and second evaluation values when the first evaluation value is lower than the second evaluation value;
- a head character management ability setting step in which the computer sets a management ability value used to reflect the management ability on the match game based on the evaluation difference value, the management ability value being changed to reduce the management ability of the head character as the evaluation difference value increases in the head character management ability setting step; and
- a management ability information storage step in which the computer stores a management ability determination table in which a plurality of the evaluation difference values are respectively associated with a plurality of reduction amounts of the management ability value such that a higher the reduction amount of the management ability value the higher the evaluation difference value; and
- wherein the head character management ability setting step specifies, from among the reduction amounts of the management ability value in the management ability determination table, a reduction amount of the management ability value corresponding to an evaluation difference value calculated by the evaluation difference value calculating unit, and reduces the management ability value by the specified reduction amount of the management ability value.

* * * * *